United States Patent [19]
Sayers et al.

[11] Patent Number: 5,932,291
[45] Date of Patent: *Aug. 3, 1999

[54] ORMOCER COATED PAPERMACHINE CLOTHING

[75] Inventors: Ian Christison Sayers, Ribchester; Thomas Saunders, Blackburn, both of United Kingdom

[73] Assignee: Scapa Group PLC, Blackburn, United Kingdom

[ * ] Notice: This patent is subject to a terminal disclaimer.

[21] Appl. No.: 08/640,965

[22] PCT Filed: Nov. 16, 1994

[86] PCT No.: PCT/GB94/02523

§ 371 Date: May 9, 1996

§ 102(e) Date: May 9, 1996

[87] PCT Pub. No.: WO95/13855

PCT Pub. Date: May 26, 1995

[30] Foreign Application Priority Data

Nov. 16, 1993 [GB] United Kingdom .................... 9323619
Feb. 1, 1994 [GB] United Kingdom .................... 9401903

[51] Int. Cl.$^6$ ........................................................ B05D 3/02
[52] U.S. Cl. ................ 427/387; 210/500.1; 210/500.25; 427/389.9; 427/412; 427/209; 428/242
[58] Field of Search ............................... 210/490, 500.25, 210/500.26, 500.36, 500.1; 428/242; 427/515, 573, 434.6, 209, 2.31, 387, 389.9, 412; 101/492; 385/130; 556/10; 162/DIG. 1

[56] References Cited

U.S. PATENT DOCUMENTS

| | | | |
|---|---|---|---|
| 4,981,745 | 1/1991 | Lefkowitz | 428/327 |
| 5,353,706 | 10/1994 | Heming et al. | 101/492 |
| 5,369,722 | 11/1994 | Heming et al. | 385/130 |
| 5,370,919 | 12/1994 | Franceska Fiews et al. | 427/387 |
| 5,372,796 | 12/1994 | Wellinghoff | 423/65 |
| 5,385,999 | 1/1995 | Claude D'Anverset et al. | 427/387 |
| 5,395,954 | 3/1995 | Soria et al. | 556/10 |
| 5,409,609 | 4/1995 | Soria et al. | 210/490 |
| 5,437,896 | 5/1995 | Kloosterboer et al. | 427/515 |
| 5,480,687 | 1/1996 | Heming et al. | 427/573 |
| 5,508,095 | 4/1996 | Allum et al. | 428/242 |

FOREIGN PATENT DOCUMENTS

| | | |
|---|---|---|
| 0486393A1 | 5/1992 | European Pat. Off. . |
| 533074 | 11/1992 | European Pat. Off. . |
| 0533074A1 | 3/1993 | European Pat. Off. . |
| 0580487A1 | 1/1994 | European Pat. Off. . |
| 0580488A1 | 1/1994 | European Pat. Off. . |
| 580487 | 7/1993 | France . |
| 580488 | 7/1993 | France . |
| 3807748 | 9/1989 | Germany . |
| 3807748A1 | 9/1989 | Germany . |
| WO95/513855 | 5/1995 | WIPO . |

*Primary Examiner*—Ana Fortuna
*Attorney, Agent, or Firm*—Jacobson, Price, Holman & Stern, PLLC

[57] ABSTRACT

A method of coating an ormocer (organically modified ceramic) on a papermachine clothing.

3 Claims, No Drawings

ORMOCER COATED PAPERMACHINE CLOTHING

The present invention relates to phase separation apparatus for use in phase separation processes, including papermaking and filtration.

When carrying out a phase separation process it is generally important to use phase separation media that exhibit good abrasion resistance, cleanliness and stability.

It is an object of the present invention to provide phase separation apparatus which exhibit such properties.

According to the present invention there is provided the use of at least one ormocer in phase separation apparatus.

The ormocer preferably acts as a phase separation medium such as a filter or papermachine clothing.

The phase separation apparatus of the invention may comprise papermachine clothing possibly including a fabric in combination with the ormocer.

Alternatively the phase separation apparatus may comprise a filter comprising a filter element including the ormocer.

Ormocers (organically-modified ceramics) are inorganic/organic composites combining the properties of ceramics with those of organic components. For the avoidance of doubt the term ormocer used herein includes organically-modified silicates. One example of an ormocer is an organosilane-impregnated silica gel which can be pyrolysed to form SiC-reinforced silica which is two to three times harder than the silica matrix alone.

An ormocer typically comprises a polar component, a hydrophobic component and micro-ceramic particles. The polar component provides good adhesion of the ormocer to the substrate. This is particularly important for papermachine clothing where adhesion of coatings to conventional polyethylene terephthalate (PET) clothing material is difficult to achieve. The hydrophobic component, which may be a fluorinated material, is preferably orientated to the air-coating interface so as to impart non-stick properties at the coating surface. The micro-ceramic particles impart abrasion resistance and anti-scratch properties.

The ormocers can be made by a typical sol-gel process. Gels are useful in that they have a good capacity to incorporate both organic and inorganic components and they allow very fine ormocer particles to be produced. Generally, sol-gel derived materials can be cast to shape at room temperature. Therefore they are excellent low-temperature hosts for organic molecules, polymers and fibres.

An additional method of preparing an ormocer coating is by impregnating porous xerogels with organic monomers and then curing the coating in situ.

Ormosils can be made by combining tetraalkoxysilanes with alkyl substituted and organofunctional alkoxysilanes, namely $Si(OR)_4 + R_2Si(OR)_2 + YR^1Si(OR)_3$ where R is alkyl, $R^1$ is alkylenyl and Y is an organofunctional group such as $-R^1-NH_2$, $-R^1NHCOONH_2$ or $-R^1-S-R^1-CHO$. The choice of precursors depends on the solubility or thermal stability of the organofunctional substituents.

Typically ormocers are based on alumina, zirconia, titanium dioxide or silica-based organic network formers containing epoxy or methacrylate groups bonded to silicon atoms via a Si—C bond.

Either the network formers or work modifiers can be tailored for specific applications. For example, epoxysilanes may be used to impart scratch resistance. Thermoplastic or photocurable groups based on diphenylsilanes or photocurable ligands, such as methacryl vinyl or allyl groups, in combination with a variety of polymerisable monomers may be used for coatings and adhesiveness.

The ormocer may be coated on a surface of a substrate. The substrate may comprise ceramic, glass, metal or plastics, but is preferably a fabric. Any suitable coating method may be employed for coating the substrate with the ormocer, such as immersion, spraying or roller or lick coating. The ormocer is then heated to a temperature in the order of 90° C. to 140° C. depending on the ormocer concerned, or is cured by ultra-violet radiation (eg wave lengths of 365 nm or 254 nm) to fix the ormocer onto the substrate. Adherence of the coating to a PET substrate may be improved by pretreatment of the substrate by means of a primer or corona discharge.

Alternatively, if the substrate is a fabric, the individual yarns may be individually coated with the ormocer prior to their incorporation into the fabric. Otherwise finely divided ormocer particles may be introduced into the polymer melt prior to extrusion. The constituent polymer yarns of the fabric may be extruded in this manner.

When used in papermachine clothing such as forming wires or dryer fabrics the hydrophobic nature of the ormocer coating reduces the accumulation of pitch and other contaminants in the fabric. The fabric stability, particularly for forming fabrics is improved by the fixing of yarn cross-over points. In addition the coatings are highly heat resistant and far more resistant to water vapour penetration than conventional coatings comprising purely organic materials. The ceramic nature of the coating may advantageously be used in fabrics in the field of impulse drying by offering protection against glazing.

Applications in the field of filtration include ultra-filters (fine filter elements). These are generally prepared from ceramics in order to achieve resistance to corrosion and high temperatures. Sol-gel technology enables ultra-filters with a 1–100 nm diameter pore size to be prepared on, for example a porous or (semi) flexible substrate, such as a filter fabric.

In a further embodiment of the invention the phase separation apparatus comprises a papermaking machine, calender machine or the like using a roller, at least a part of the roller having a coating comprising the ormocer.

The invention has particular application in rollers in the press and dryer sections of papermaking machines, and off-machine calender rolls.

Known calender rolls are often made of many cotton, steel or synthetic discs arranged on a mandrel which are then optionally coated with resin and/or polymer. The calender rolls are subject to abrasion when in use. Known cotton rolls generally exhibit poor releasability.

The ormocer coated rollers of the invention show vastly improved abrasion resistance and releasability. Releasability can be improved by the incorporation of a fluoropolymer into the coating. This is especially useful for rollers used in the preparation of resin-treated fabrics.

Furthermore any damaged area of coating could be easily repaired by stripping a patch around the damaged area, for example by sandblasting and then simply applying a fresh coating of ormocer to the stripped area.

The ormocers used in the phase separation apparatus of the present invention are preferably based upon polycondensates of one or more hydrolysable compounds of elements of main groups III to V and sub-groups II to IV of the periodic table, such as boron, aluminium, silicon, tin, lead, titanium, zirconium, vanadium or zinc. The hydrolysable compounds ideally contain hydrolysable groups and non-hydrolysable carbon-containing groups in a molar ratio from 10–1 to 1–2 with respect to the monomeric starting materials. At least some of the non-hydrolysable carbon-containing groups ideally comprise fluorine atoms bonded to carbon atoms.

The compounds are made by mixing the required starting materials together in water for hydrolysis and precondensation. Any fluorine containing materials are, however, added after hydrolysis and precondensation of the other materials. After the fluorinated groups have reacted with the other materials more water may be added. This method prevents the fluorinated materials separating out from the other materials so as to provide a two-phase system.

The hydrolysable groups referred to above preferably comprise one or more of the following: alkoxy, aryloxy, acyloxy, alkylcarbonyl halogen or hydrogen.

The non-hydrolysable groups referred to above preferably comprise one or more of the following: alkyl, alkenyl, alkynyl, aryl, alkaryl or alkoxy.

Examples of suitable starting materials include any of the following:

CF3CH2CH2SiCl2(CH3), CF3CH2CH2SiCl(CH3)2,
CF3CH2CH2Si(CH3) (OCH3)2,
i-C3F7O — (CH2) 3 — SiCl2(CH3),
n-C6F13CH2CH2SiCl2(CH3), n-C6F13CH2CH2SiCl(CH3)2,
CF3CH2CH2 — SiY3, C2F5CH2CH2 — SiY3,
C4F9CH2CH2 — SiY3, n-C6F13CH2CH2 — SiY3,
n-C8F17CH2CH2SiY3, n-C10F21CH2CH2 — SiY3,
(Y = OCH3, OC2H5 or Cl)

TiCl4, Ti(OC2H5)4, TI(OC3H7)4, Ti(O-i-C3H7)4, TI(OC4H9)4,
Ti(2-ethylhexoxy)4, ZrCl4, Zr(OC2H5)4, Zr(OC3H7)4,
Zr(O-i-C3H7)4, Zr(OC4H9)4, ZrOCl2 and Zr(2-ethylhexoxy)4

Al-(OCH3)3, Al(OC2H5)3, Al(O-N-C3H7)3, Al(O-i-C3H7)3,
Al(OC4H9)3, Al(O-i-C4H9)3, Al(o-sec-C4H9)3 and AlCl(OH)2

Si(OCH3)4, Si(OC2H5), Si(O-n- or i-C3H7)4, Si(OC4H9)4,
SiCl4, HSiCl3, Si(OOCCH3)4, CH3 — SiCl3,
CH3 — Si(OC2H5)3, C2H5 — SiCl3,
C2H5 — Si(OC2H5)3, C3H7 — Si(OCH3)3,
C6H5 — Si(OCH3)3, C6H5 — Si(OC2H5)3,
(CH3O)3 — Si — C3H6 — Cl, (CH3)2SiCl2,
(CH3)2Si(OCH3)2, (CH3)2Si(OC2H5)2, (CH3)2Si(OH)2,
(C6H5)2SiCl2, (C6H5)2Si(OCH3)2, (C6H5)2Si(OC2H5)2,
(i-C3H7)3SiOH, CH2 = CH — SiCl3,
CH2 = CH — CH2 — Si(OC2H5)3,
CH2 = CH — CH2 — Si(OOCCH3)3,
CH2 = C(CH3) — COO — C3H7 — Si(OCH3)3,
CH2 = C(CH3) — COO — C3H7 — Si(OC2H5)3,
(C2H5O)3Si — C6H4 — NH2,
CH3(C2H5O)2Si — (CH2)4 — NH2,
(C2H5O)3Si — C3H6 — NH2,
(CH3)2(C2H5O)Si — CH2 — NH2,
(C2H5O)3Si — C3H6 — CN, (CH3O)3Si — C4H8 — SH,
(CH3O)Si — C6H12 — SH, (CH3O)3Si — C3H6 — SH,
(C2H5O)3Si — C3H6 — SH,
(CH3O)3Si — C3H6 — NH — C2H4 — NH2,
(CH3O)3Si — C3H6 — NH — C2H4 — NH — C2H4 — NH2,

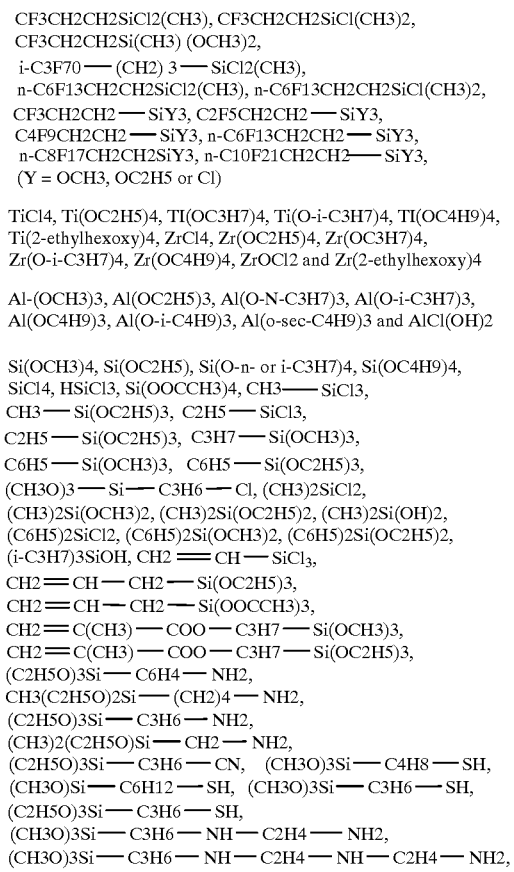

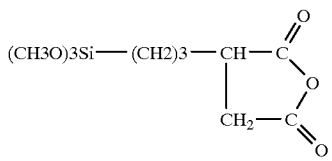

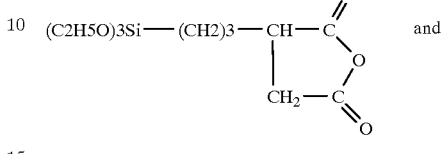

(C2H5O)SSi — (CH2)3 - NH — CO — N — CO — (CH2)4 - CH2

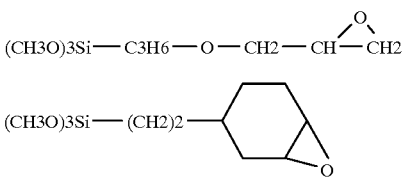

In order that the present invention may be more readily understood a specific embodiment thereof will now be described by way of example only:

A typical ormocer coating for papermachine clothing was prepared by hydrolysing gamma-glycidyloxypropyltrimethoxysilane (using 1.5 moles of water per mole of the silane) at pH 5.5 (obtained by bubbling with carbon dioxide) for 16 hours at 25° C. This hydrolysed silane was applied to a PET fabric by dip coating and then cured at 130° C.

The 10 micron thick coating remained undamaged after 14 days at 40° C., 100% relative humidity and showed good adhesion, flexibility and abrasion resistance.

It is to be understood that the above described embodiment is by way of illustration only. Many modifications and variations are possible.

We claim:

1. A method of using at least one ormocer as coating for facilitating phase separation in a papermachine clothing, consisting essentially of:

providing at least one ormocer; and coating the papermachine clothing with the at least one ormocer, wherein the ormocer comprises a perfluorinated material.

2. The method as claimed in claim 1, wherein the paperclothing machine is selected from the group consisting of yarn and fabric.

3. The method as claimed in claim 2, wherein the ormocer comprises a polar component, a hydrophobic component and micro-ceramic particles, the polar component being orientated towards the substrate and the hydrophobic component being orientated towards the coating surface.

* * * * *